Aug. 16, 1960  K. FINKL  2,949,076
IRIS DIAPHRAGM

Filed June 11, 1956 2 Sheets-Sheet 1

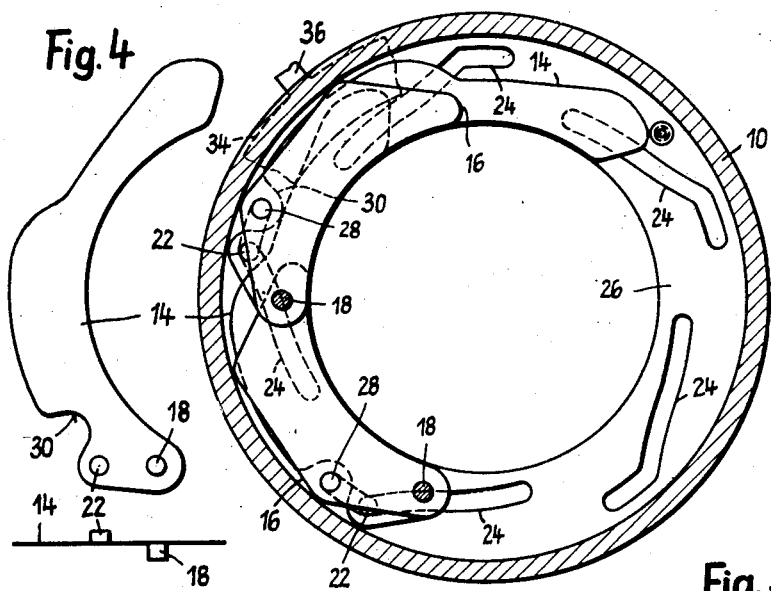
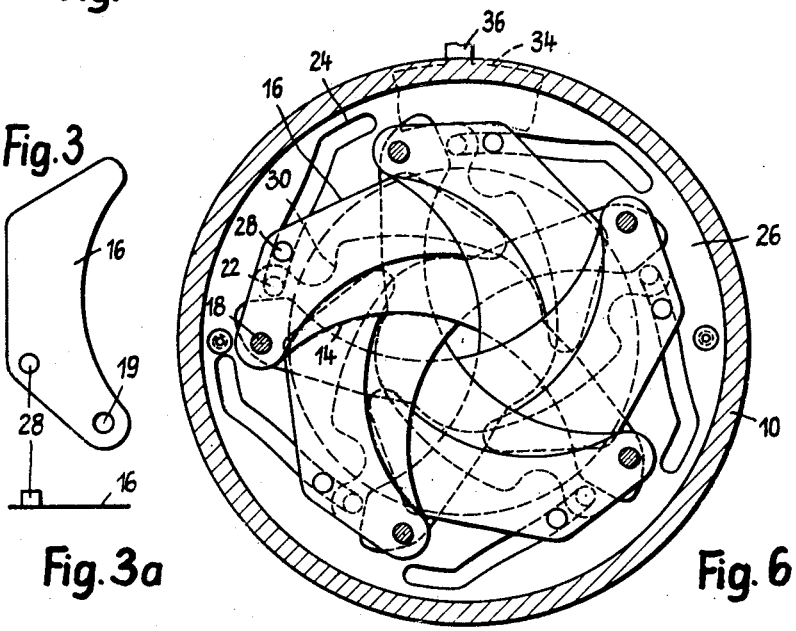

United States Patent Office 2,949,076
Patented Aug. 16, 1960

2,949,076

IRIS DIAPHRAGM

Karl Finkl, Munich, Germany, assignor, by mesne assignments, to Compur-Werk Friedrich Deckel OHG, Munich, Germany, a German firm Filed June 11, 1956, Ser. No. 590,525

Claims priority, application Germany June 16, 1955

1 Claim. (Cl. 95—64)

This invention relates to an iris diaphragm, especially for photographic apparatus such as shutters, enlargers, or other photographic or optical equipment.

An object of the invention is the provision of a generally improved and more satisfactory diaphragm structure.

Another object is the provision of a diaphragm so constructed and arranged as to provide a particularly compact construction, in which the exterior diameter of the housing or casing of the blade mechanism is small as compared with the maximum size of the aperture or light passage when the diaphragm is adjusted to its fully open position.

A further object is the provision of a compact diaphragm structure in a particularly simple and inexpensive form.

These and other desirable objects may be attained in the manner disclosed as an illustrative embodiment of the invention in the following description and in the accompanying drawings forming a part hereof, in which:

Fig. 3 is a plan of a diaphragm leaf or blade of one of the two series of leaves employed in the present construction;

Fig. 3A is an edge view of the same;

Fig. 4 is a plan of one leaf or blade of the second series of leaves employed in the present construction;

Fig. 4A is an edge view of the same;

Fig. 5 is a face view of the diaphragm mechanism (with the housing in transverse section) showing the diaphragm adjusted to maximum aperture; and Figure 6 is a similar view showing the diaphragm adjusted to minimum aperture.

The same reference numerals throughout the several views indicate the same parts.

Figure 1:
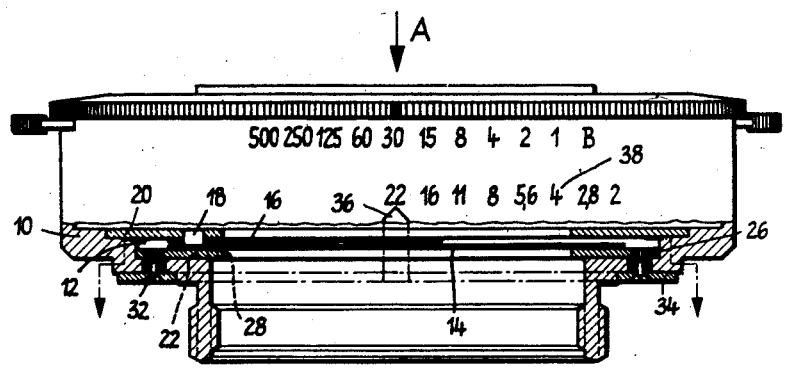
Fig. 1 is a top plan view, with parts broken away and parts in diametrical section, of a photographic shutter equipped with a diaphragm in accordance with a preferred embodiment of the present invention.
Figure 2:
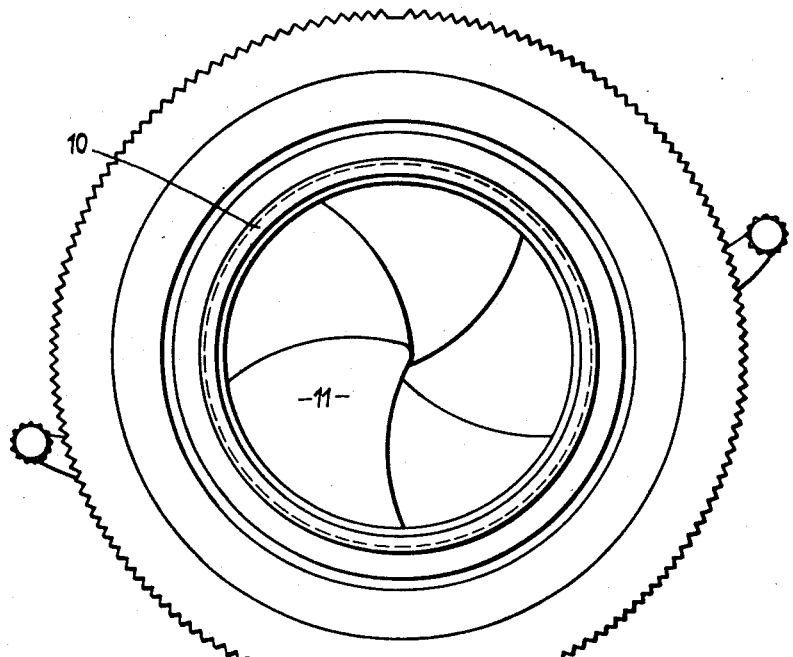
Fig. 2 is a front elevation or front face view of the shutter.

As above indicated, the diaphragm of the present invention may be used in connection with various kinds of photographic and optical apparatus or equipment, but will probably find its greatest usefulness in photographic shutters, and the construction is here illustrated in conjunction with a shutter, for the sake of a convenient example. The shutter comprises the usual annular housing or casing of generally cylindrical form, indicated in general at 10. In the usual annular space within this housing, there is the usual operating mechanism for opening and closing the shutter blades 11 in known manner, so that, when the blades are open, light may enter in the direction of the optical axis indicated by the arrow A in Fig. 1.

Near the rear of the housing or casing 10 there is provided an annular space 12 for receiving the leaves of the iris diaphragm of the present invention. The diaphragm leaves or blades are adjustable so as to vary the size of the aperture or stop through which light may enter the camera or other optical apparatus, when the shutter blades 11 are opened.

According to the present invention, the diaphragm is made up of two separate series of leaves, but the leaves of the second series are pivoted on the same pivots as the leaves of the first series, and their swinging or adjusting movements are controlled by the same control slots which operate the leaves of the first series. The leaves of the first series serve to form the outline or periphery of the desired aperture, but these leaves are made relatively narrow in order to be accommodated, when opened for maximum aperture, within a smaller and more compact housing than would be required if the leaves were wider. Because of the narrow dimensions of the leaves of the first series, the outer edges of these leaves do not extend all the way to the edges of the fixed light passageway in the housing, when the leaves of the first series are adjusted for a relatively small aperture. Therefore the leaves of the second series are provided, to close the gaps or spaces between the leaves of the first series and the fixed housing, when the diaphragm is adjusted for a relatively small aperture. By pivoting the leaves of both series on the same pivots, and by controlling both sets of leaves from the same control slots or cam slots, the construction can be made quite economically in spite of the use of two sets of leaves instead of one.

The leaves or blades of the first series, which control the size of the aperture, are indicated at 14. The leaves or blades of the second series, which close the gaps or spaces around the leaves of the first series, are indicated at 16. Each series may consist of any desired number of leaves, of identical size and shape, five leaves of each series being here shown.

Each of the leaves 14 of the first series has a pivot pin 18 rotatably supported in a stationary supporting ring 20 mounted in the shutter case in front of the annular space 12 which receives the diaphragm leaves. Furthermore, each leaf 14 has a guide pin 22 which engages in a guide slot or cam slot 24 formed in a diaphragm control ring 26 which is rotatable in the shutter casing, at the rear of the annular space 12. There is one of these control slots or cam slots 24 for each of the diaphragm leaves of the first series. When the ring 26 is turned, the action of the slots 24 on the control pins 22 will serve to swing the leaves 14 on the pivots 18, to move the arcuate edges of the leaves 14 closer to or farther away from the optical axis passing through the center of the structure. In Fig. 5, the leaves 14 are shown opened up to the maximum aperture, some of the leaves being omitted in this view for the sake of greater clarity. In Fig. 6, the leaves are shown closed down to provide the minimum aperture.

It is seen especially from Figs. 4 and 5 that the leaves 14 are relatively narrow, thereby enabling the surrounding part of the casing to be brought fairly close (in a radial direction) to the optical aperture as defined by the inner annular edge of the rings 20 and 26. In other words, because of the relative narrowness of the blades 14, the casing does not require any large radial dimension (from the edge of the optical aperture outwards) in order to receive the leaves in the fully opened position. However, this narrowness of the blades or leaves, so desirable from the standpoint of compactness of the casing, results in the fact that when the leaves are swung inwardly to form the minimum size of aperture, the outer edges of the leaves will not extend fully to the edges of the optical aperture, but will leave gaps or spaces.

It is to close these gaps or spaces that the leaves 16 of the second set or series are provided. The leaves 16 of the second series lie just in front of the leaves 14 of the first series, as may be seen from Fig. 1; that is, they lie between the leaves 14 and the stationary ring 20. Each leaf 16 has near one end a bearing opening 19 which loosely and turnably embraces the pivot pin 18 of one of the leaves 14 of the first series. The pivot pins 18 thus form a common support or axis of rotation for one of the leaves 14 of the first series and an associated one of the leaves 16 of the second series.

Each leaf 16 also has a control pin or guide pin 28 which extends into the same guide slot 24 of the ring 26 in which the pin 22 of the associated leaf 14 is engaged. Thus each guide slot or cam slot 24 serves, through the pins 22 and 28 to control the movement of two leaves 14 and 16, both turnable on the same pivot 18. Each leaf 14 has a notch 30 in its outer edge, so placed as to provide clearance space for the pin 28 of the associated or companion leaf 16.

The diaphragm control ring 26, located inside the shutter housing, is connected to an external diaphragm setting ring 34 rotatably at the back of the shutter housing by means of a plurality of connectors or drivers 32 (Fig. 1) which extend through arcuate slots in the housing. The setting ring 34 is provided with a suitable pointer 36 which cooperates with a diaphragm aperture scale 38 marked on a suitable external part of the shutter casing.

When the external setting ring 34 is turned, the rotary motion thereof is transmitted through the connectors 32 to the internal setting ring 26. The turning of the ring 26 causes the inclined cam slots 24 thereof to act on the control pins 22 and 28 of the two series of diaphragm leaves, simultaneously swinging the leaves of both series so that the leaves 14 will collectively form the desired size of aperture or stop to limit the maximum size of the beam of light which can pass through the structure, while the leaves 16 of the second series will serve to close the gaps or openings which are left around the outside of the leaves 14 of the first series, when the latter are adjusted for relatively small aperture.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claim.

What is claimed is:

An iris diaphragm, particularly for photographic purposes, comprising stationary supporting means defining a circular maximum exposure aperture, a diaphragm adjusting ring rotatably mounted on said supporting means to turn concentrically with respect to said exposure aperture, a series of cam slots in said ring, each cam slot extending obliquely in a generally circumferential direction and having a circumferential extent materially greater than its extent in a direction radially with respect to said aperture, a first set of substantially flat aperture-adjusting leaves equal in number to the number of cam slots in said ring, each leaf of said first set being relatively long and narrow with a length substantially greater than the diameter of said maximum exposure aperture and a width at its widest point substantially less than the radius of said maximum exposure aperture and having one longitudinal edge concavely curved and faced in a direction toward the center of said maximum exposure aperture, a second set of substantially flat gap-closing leaves equal in number to the leaves of the first set, each leaf of the second set being substantially shorter than the diameter of said maximum exposure aperture and substantially narrower than the radius of said maximum exposure aperture, a pivot pin fixed to each leaf of the first set near one end thereof and projecting from only one face of such leaf and passing through a companion leaf of the second set near one end thereof and into said stationary supporting means so that two companion leaves, one from each set, may swing on the pivotal axis defined by the center of each pivot pin, and the effective length of each of said gap-closing leaves, from its pivot pin to its remote end, is greater than the distance between any two adjacent pins, and in which each of said gap-closing leaves, when adjusted to position for maximum effective aperture, overlaps the pivot pin of the next adjacent gap-closing leaf on one side thereof, a control pin fixed to each leaf of the first set in a position spaced from the pivot pin thereof and projecting from the face thereof opposite to the face from which said pivot pin projects, each leaf of said first set having an outwardly facing notch adjacent its respective control pin, and a control pin fixed to each leaf of said second set in a position spaced from the pivot pin on which such leaf is mounted and projecting from the face of such leaf of the second set whch is faced toward the companion leaf of the first set, the two control pins of each pair of two companion leaves both entering the same cam slot of said adjusting ring in such position that when said ring is turned in one direction, all of the leaves of the first set will be swung toward the center of said maximum exposure aperture to define by their collective concave edges an effective exposure aperture smaller than said maximum exposure aperture and all of the leaves of the second set will be swung to a lesser extent toward the center of said maximum exposure aperture to close any gaps otherwise formed between the edges of said maximum exposure aperture and the outer edges of the leaves of the first set, each of said control pins of said leaves of said second set entering its respective notch in the leaves of said first set when said ring is turned in the other direction toward a position of maximum effective aperture.

References Cited in the file of this patent

UNITED STATES PATENTS

| 1,302,359 | Barbutt | Apr. 29, 1919 |
| 2,531,034 | Doyle | Nov. 21, 1950 |

FOREIGN PATENTS

| 653,345 | Germany | Dec. 6, 1937 |
| 585,691 | Great Britain | Feb. 19, 1947 |